United States Patent
Su et al.

(10) Patent No.: US 11,455,254 B2
(45) Date of Patent: Sep. 27, 2022

(54) FLASH MEMORY SYSTEM AND FLASH MEMORY DEVICE THEREOF

(71) Applicant: MACRONIX International Co., Ltd., Hsinchu (TW)

(72) Inventors: Chun-Lien Su, Taichung (TW); Chun-Hsiung Hung, Hsinchu (TW); Shuo-Nan Hung, Hsinchu County (TW)

(73) Assignee: MACRONIX INTERNATIONAL CO., LTD., Hsinchu (TW)

(*) Notice: Subject to any disclaimer, the term of this patent is extended or adjusted under 35 U.S.C. 154(b) by 0 days.

(21) Appl. No.: 17/118,239

(22) Filed: Dec. 10, 2020

(65) Prior Publication Data
US 2022/0188238 A1 Jun. 16, 2022

(51) Int. Cl.
*G06F 12/0882* (2016.01)
*G06F 11/10* (2006.01)
*G06F 12/02* (2006.01)
*G06F 12/0862* (2016.01)

(52) U.S. Cl.
CPC ...... *G06F 12/0882* (2013.01); *G06F 11/1068* (2013.01); *G06F 12/0246* (2013.01); *G06F 12/0862* (2013.01)

(58) Field of Classification Search
None
See application file for complete search history.

(56) References Cited

U.S. PATENT DOCUMENTS

| | | | | |
|---|---|---|---|---|
| 6,469,955 B1* | 10/2002 | Tsao | ......... | G11C 7/1042 365/189.05 |
| 8,230,303 B2* | 7/2012 | Choi | ......... | G11C 11/5628 714/773 |
| 8,438,455 B2* | 5/2013 | Vogan | ......... | G06F 11/108 714/764 |
| 2004/0083334 A1* | 4/2004 | Chang | ......... | G06F 11/1008 711/103 |
| 2005/0172065 A1* | 8/2005 | Keays | ......... | G06F 12/0246 711/103 |
| 2005/0172086 A1* | 8/2005 | Kawai | ......... | G11C 16/3418 711/154 |
| 2005/0185472 A1* | 8/2005 | Randell | ......... | G06F 12/0893 365/185.33 |
| 2007/0147115 A1* | 6/2007 | Lin | ......... | G06F 13/1694 365/185.08 |

(Continued)

*Primary Examiner* — Yaima Rigol
(74) *Attorney, Agent, or Firm* — J.C. Patents

(57) ABSTRACT

A flash memory system and a flash memory thereof are provided. The flash memory device includes a NAND flash memory and a control circuit. The NAND flash memory chip includes a cache memory, a page buffer; and an NAND flash memory array. The NAND flash memory array includes a plurality of pages, wherein each page includes a plurality of sub-pages, each sub-page has a sub-page length. The cache memory is composed of a plurality of sub cache and each sub cache corresponds to different pages of the NAND flash memory array. The page buffer is composed of a plurality of sub-page buffers and each sub-page buffer corresponds to different pages of the NAND flash memory array. The control circuit is coupled to the host and the NAND flash memory, and performs an access operation in units of one sub-page.

15 Claims, 5 Drawing Sheets

(56) References Cited

U.S. PATENT DOCUMENTS

| | | | |
|---|---|---|---|
| 2007/0174578 A1* | 7/2007 | Oshima | G06F 12/0246 |
| | | | 711/170 |
| 2008/0155379 A1* | 6/2008 | Katoh | G11B 20/1833 |
| | | | 714/764 |
| 2010/0125444 A1* | 5/2010 | Arya | G06F 12/0246 |
| | | | 703/26 |
| 2012/0069657 A1* | 3/2012 | Choi | G11C 16/3404 |
| | | | 365/185.09 |
| 2012/0159072 A1* | 6/2012 | Hida | G06F 12/0862 |
| | | | 711/119 |
| 2012/0268993 A1* | 10/2012 | Park | G11C 16/10 |
| | | | 365/185.11 |
| 2014/0269065 A1* | 9/2014 | Jigour | G11C 16/3404 |
| | | | 365/185.09 |
| 2015/0095551 A1* | 4/2015 | Confalonieri | G11C 16/06 |
| | | | 711/103 |
| 2015/0193157 A1* | 7/2015 | Hwang | G06F 11/1048 |
| | | | 714/764 |
| 2015/0378887 A1* | 12/2015 | Lee | G11C 16/28 |
| | | | 711/103 |
| 2016/0314833 A1* | 10/2016 | Lee | G11C 11/5628 |
| 2018/0349041 A1* | 12/2018 | Zhou | G06F 12/0897 |
| 2020/0019508 A1* | 1/2020 | Oh | G11C 7/1084 |

\* cited by examiner

FLASH MEMORY SYSTEM AND FLASH MEMORY DEVICE THEREOF

BACKGROUND OF THE INVENTION

1. Field of the Invention

The present invention relates to a memory system, in particular, to a flash memory system and a flash memory device thereof.

2. Description of Related Art

Flash memory is divided into an NAND flash memory and an NOR flash memory. The NOR flash memory has the characteristic of rapidly and randomly reading data, and operates in memory mapping mode to support a Direct Memory Access (DMA) operation and an eXecute-In-Place (XIP) function. The NOR flash memory is generally a requirement of embedded-in application. However, the commonly-known NAND flash memory has a large capacity and accesses in units of a page. Therefore, a long sensing period is needed, and resulted delay time of page access is overlong. In order to improve execution efficiency, an access operation of a general NAND flash memory is commonly performed into a plurality of stages. Therefore, the NAND flash memory is generally not suitable for performing a random access operation, such as XIP. But with the increase of the requirements of the embedded-in application, the capacity of the traditional NOR flash memory is not enough to use. Thus, how to provide a novel memory structure to meet the requirements of the embedded-in application becomes an important subject.

SUMMARY OF THE INVENTION

The present invention provides a flash memory system, which makes an NAND flash memory suitable for performing a random access operation so as to meet the increasing requirements of an embedded application.

The flash memory device of the present invention includes a NAND flash memory and a control circuit. The NAND flash memory chip includes a cache memory, a page buffer; and an NAND flash memory array. The NAND flash memory array includes a plurality of pages, wherein each page includes a plurality of sub-pages, each sub-page has a sub-page length. The cache memory is composed of a plurality of sub caches and the plurality of sub caches corresponds to different pages of the NAND flash memory array. The page buffer is composed of a plurality of sub-page buffers and the plurality of sub-page buffers corresponds to different pages of the NAND flash memory array. The control circuit is coupled to the host and the NAND flash memory, and performs an access operation in units of one sub-page.

In one embodiment of the present invention, the host controls the control circuit to perform data prefetching on adjacent pages of currently read pages and stores the prefetched data on the page buffer or the cache memory.

In one embodiment of the present invention, data of each sub-page includes a sub-page error correction code, and the control circuit performs error correction on data of the corresponding sub-pages according to the sub-page error correction code.

In one embodiment of the present invention, the sub-page error correction code has 1 bit correction capability.

In one embodiment of the present invention, when the control circuit fails to correct errors of the data of the corresponding sub-page according to the sub-page error correction code, the control circuit re-reads data of a page including the corresponding sub-page by the page buffer, stores the data of the page into the cache memory, and corrects all the data of the page, including the corresponding sub-page, according to the data of the page and a page error correction code included in the page.

In one embodiment of the present invention, the page error correction code has multiple bits correction capability.

In one embodiment of the present invention, the cache memory is a multiple-level cache memory, a cache operation is performed on the multiple-level cache memory in units of one sub-page.

In one embodiment of the present invention, the NAND flash memory includes a plurality of memory planes, each plane corresponds to different caches.

In one embodiment of the present invention, the NAND flash memory includes cache memories, the control circuit performs a cache operation on the cache memories to selectively transfer data among the cache memories in units of one sub-page.

In one embodiment of the present invention, the control circuit includes a sub-page selector. The sub-page selector is coupled to the NAND flash memory, controlled by address information of the command from the host and used to selectively transfer data between the page buffer and the cache memory in units of one sub-page.

In one embodiment of the present invention, the NAND flash memory array includes a tag table that records the address information of the sub-pages of the page buffer and the cache memory.

In one embodiment of the present invention, the control circuit reads out the data, the content of program being executed, from the plurality of sub-pages of the NAND flash memory array, stores read out sub-page data to the corresponding sub-page buffer, selects sub-page data to be overridden on demand from the cache memory based on a predetermined data replacement algorithm, and transfers the read out sub-page data stored in the sub-page buffer to the cache memory.

In one embodiment of the present invention, when the data, the content of program being executed, is stored in the cache memory, the control circuit conveys the data read from the cache memory to the host.

In one embodiment of the present invention, when the data, the content of program being executed, is stored in the page buffer instead of storing in the cache memory, the control circuit selects the sub-page data to be overridden from the cache memory based on the predetermined data replacement algorithm and transfers the data stored in the page buffer to the cache memory.

The flash memory system of the present invention includes a host and a flash memory device. The host is used for fetching data. The flash memory device is coupled to the host, and accessed by the host for data. The flash memory device includes an NAND flash memory and a control circuit. The NAND flash memory chip includes a cache memory, a page buffer; and an NAND flash memory array. The NAND flash memory array includes a plurality of pages, wherein each page includes a plurality of sub-pages, each sub-page has a sub-page length. The cache memory is composed of a plurality of sub caches and the plurality of sub caches corresponds to different pages of the NAND flash memory array. The page buffer is composed of a plurality of sub-page buffers and the plurality of sub-page buffers corresponds to different pages of the NAND flash memory array. The control circuit is coupled to the host and the NAND flash memory, and performs an access operation in units of one sub-page.

Based on the above, each page of the NAND flash memory array of the embodiments of the present invention includes the plurality of sub-pages, each sub-page has the sub-page length. Each sub-page in the page buffer and cache memory can correspond to different pages of the NAND memory array. The control circuit can manage sub-pages in both the cache memory and page buffer according to a tag table. For example, the control circuit can obtain the address of sub-page data in the page buffer or the cache memory corresponding to an access request according to the tag table. The sub-page data can be returned to the control circuit immediately without perform data reading on the NAND memory array if the sub-page data exists in either the page buffer or the cache memory, and thus the access time can be reduced. Therefore, the control circuit can perform access operation in units of one sub-page, and the NAND flash memory is suitable for the random access operation to meet the increasing requirements of the embedded-in application.

In order to make the aforementioned and other objectives and advantages of the present invention comprehensible, embodiments accompanied with figures are described in detail below.

DESCRIPTION OF THE EMBODIMENTS

Figure 1:
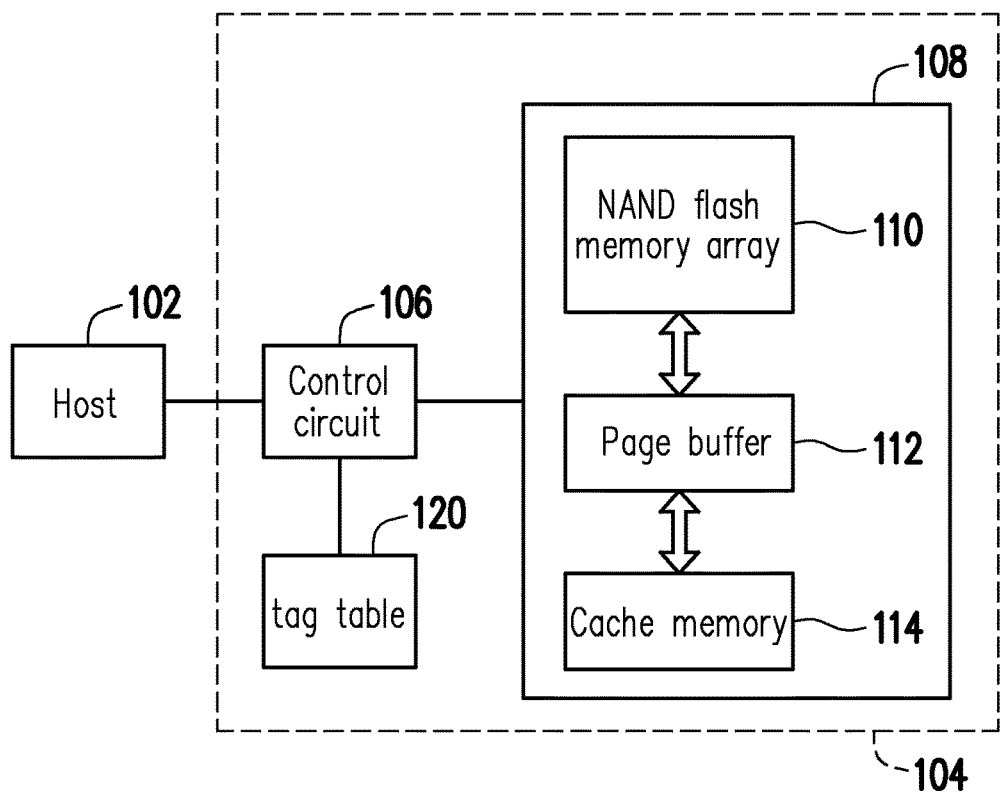
FIG. 1 is a schematic diagram of a flash memory system according to one embodiment of the present invention.

FIG. 1 is a schematic diagram of a flash memory system according to one embodiment of the present invention. Referring to FIG. 1, the flash memory system includes a host 102 and a flash memory device 104. The flash memory device 104 includes a control circuit 106 and an NAND flash memory 108. The control circuit 106 is coupled to the host 102 and the NAND flash memory 108. The NAND flash memory 108 includes an NAND flash memory array 110, a page buffer 112 and a cache memory 114.

Figure 2:
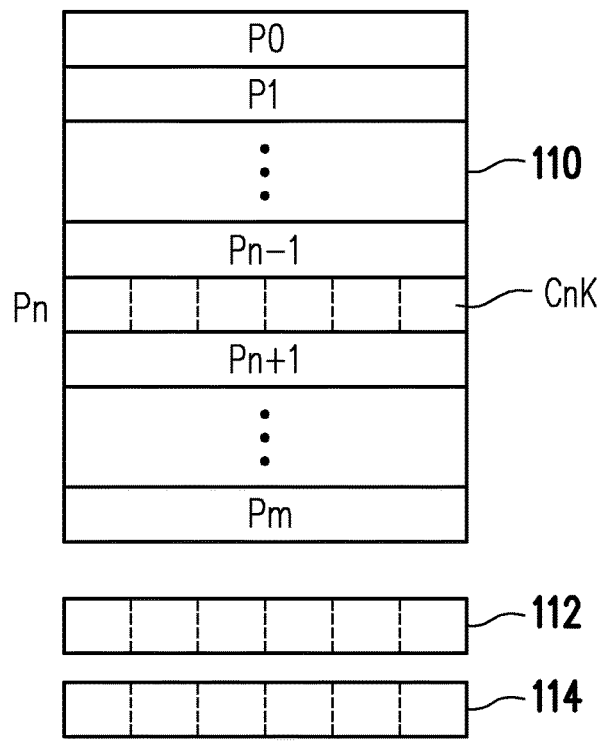
FIG. 2 is a schematic diagram of an NAND flash memory according to one embodiment of the present invention.

The flash memory device 104 is controlled by the host 102 to access data. For example, when the host 102 executes a program, the host 102 controls the control circuit 106 of the flash memory device 104 to access a programming code needed for executing the program, but is not limited therein. Furthermore, as illustrated in FIG. 2, the NAND flash memory 108 includes a plurality of pages P0-Pm. Taking page Pn in FIG. 2 as an example, each of the plurality of pages P0-Pm includes a plurality of sub-pages Cnk, wherein n and m are positive integers. Each sub-page Cnk has a sub-page length, which is, for example, 512 bytes, 256 bytes or 128 bytes, but is not limited therein. The control circuit 106 performs an access operation in units of one sub-page. Since the sub-page length of the sub-pages is small, buffer data of the page buffer 112 and cache data of the cache memory 114 include the plurality of sub-pages coming from different pages of NAND Flash memory 108. Each sub-page of sub-page buffer of the page buffer 112 corresponds to different pages of the NAND flash memory array in the same sub-page offset, and each sub-page of sub cache of the cache memory 114 corresponds to different pages of the NAND flash memory array in the same or different sub-page offset. The cache data of the cache memory 114 is completely included by the buffer data of the page buffer 112, but is not limited therein. In some embodiments, the cache data of the cache memory 114 and the buffer data of the page buffer 112 may not be duplicated. In addition, the small sub-page length of the sub-pages is beneficial for the control circuit 106 to shorten the time needed for ECC (Error Correction Code) verification and is likely to increase the speed of accessing data.

Since the sub-page length of sub-pages is small, the cache data of the cache memory 114 covers data of any plurality of pages in the NAND flash memory array 110, and meets the requirement that the needed data is usually distributed and stored in the plurality of pages when the program is executed. In addition, the small sub-page length of the sub-pages has the advantage of needing short time for the ECC verification. In addition, the NAND flash memory 108 can be operated in a memory mapping mode where NAND can be directly addressed by a host system bus and seen by a CPU or any other elements attached to the host system bus.

Since the NAND flash memory 108 possesses the above-mentioned characteristics, the host 102 directly accesses the cache memory 114 through the control circuit 106 to obtain the data needed to execute the program, and does not need to store the data needed to execute the program to other storage devices (for example, a random access memory) first. That is to say, the NAND flash memory 108 is used as an eXecute-In-Place (XIP) memory, and the host 102 directly performs the programming code in the cache memory 114. Since the access operation is performed in the cache memory 114, data access speed of the flash memory device 104 in the present embodiment is higher than data access speed of a well-known NOR flash memory.

The control circuit 106 can manage sub-pages in both the sub caches of the cache memory 114 and the sub-page buffers of page buffer 112 according to a tag table 120 maintained and managed by the control circuit 106, the tag table 120 is composed of address bits pointed to the cached sub-page. For example, the control circuit 106 can obtain the location of sub-page data in the page buffer 112 or the cache memory 114 if an access request is cache hit according to the tag table 120. The sub-page data can be returned to the control circuit 106 immediately without perform data reading on the NAND memory array 110 if the sub-page data exists in either the page buffer 112 or the cache memory 114, and thus the access time can be reduced.

Figure 3:
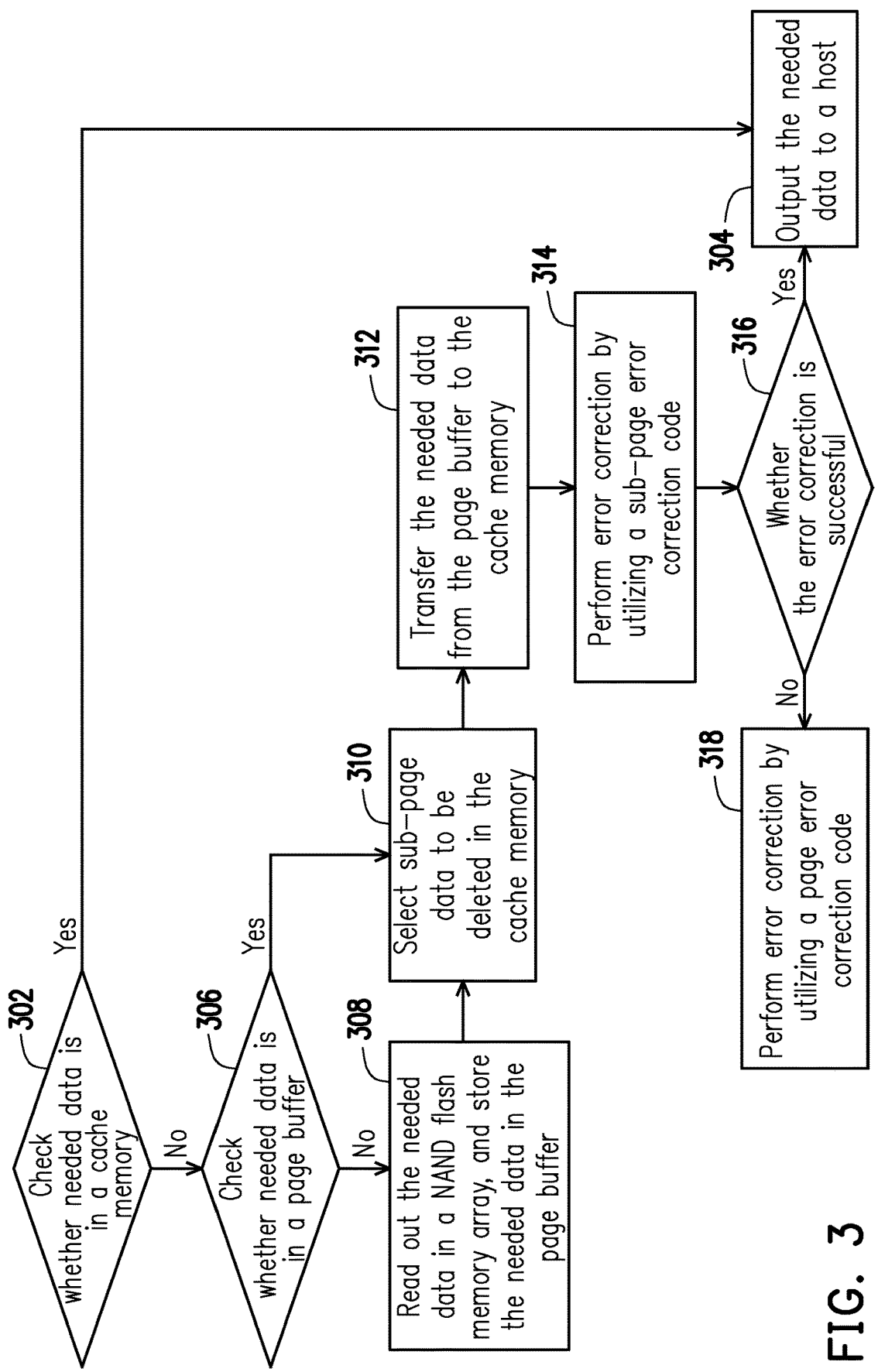
FIG. 3 is a flowchart of a cache operation of a flash memory system according to one embodiment of the present invention.

Furthermore, the cache operation executed by the control circuit 106 is illustrated in FIG. 3. The host 102 sends a request to the control circuit 106 to read data needed by the host 102 to execute the program from the NAND flash memory 108. As illustrated in FIG. 3, the control circuit 106 examines the tag table 120 firstly to check whether the data needed by the host 102 to execute the program is stored in the cache memory 114 (step S302). If the data needed by the host 102 to execute the program is stored in the cache memory 114, the needed data is read from the cache memory 114. And the read-out data is conveyed to the host 102 through an input/output port (step S304). If the data needed by the host 102 to execute the program is not stored in the cache memory 114, the control circuit 106 examines the tag table 120 to check whether the data needed to execute the program is stored in the page buffer 112 (step S306).

Figure 4:
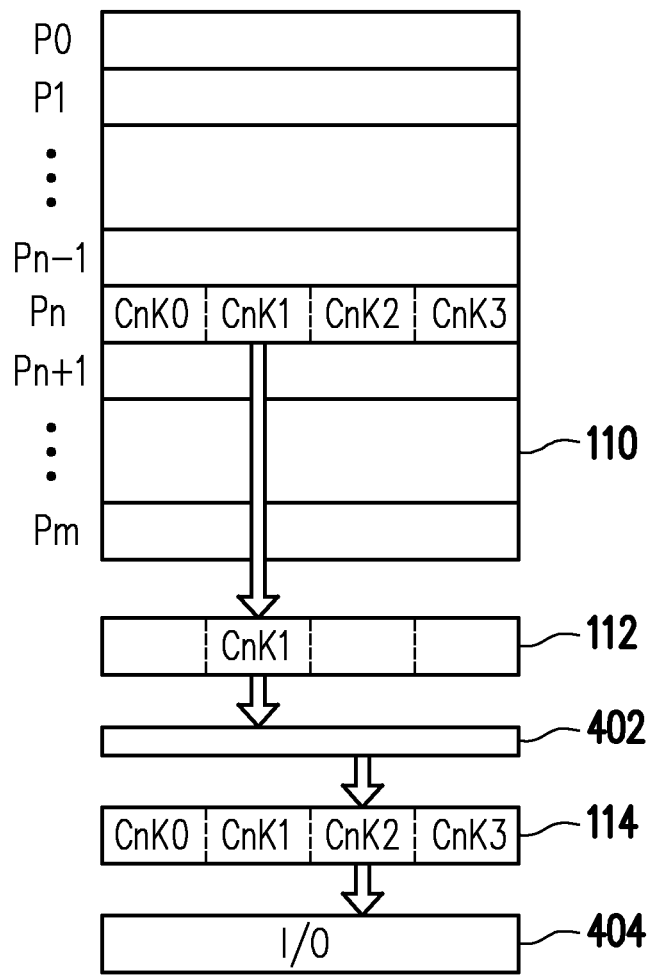
FIG. 4 is a schematic of an NAND flash memory according to another embodiment of the present invention.

If the data needed to execute the program is not stored in the page buffer 112, the control circuit 106 reads out the data needed to execute the program from the pages of the NAND flash memory array 110, and stores the read out data to the page buffer 112 (step S308) and updates the tag table 120 accordingly. For example, as illustrated in the embodiment of FIG. 4, the control circuit 106 may read out the data needed to execute the program in sub-page Cnk1 of the page Pn, store the data of the sub-page Cnk1 to the page buffer 112 and update the tag table 120.

It is worth noting that, in some embodiments, when the control circuit 106 is reading out the data needed to execute the program, the control circuit 106 may perform data prefetching on other pages (for example, the adjacent pages (for example, next page) of the pages corresponding to the found data, but not limited therein), that is, the control circuit 106 reads firstly and stores the data needed by the host 102 to execute the program later to the page buffer 112 so as to increase execution efficiency of the flash memory device 104.

Then, the control circuit 106 selects sub-page data to be deleted from the cache memory 114 based on a predetermined data replacement algorithm (step S310), wherein the predetermined data replacement algorithm is, for example, that the control circuit 106 selects the least recently used (LRU) sub-page data to delete, but is not limited therein. For example, the control circuit 106 selects the sub-page data to be deleted through a first in first out (FIFO) algorithm. After the sub-page data is selected, the data needed to execute the program stored in the page buffer 112 is transferred to the cache memory 114 (step S312) to replace the sub-page data to be deleted. The tag table 120 is revised to reflect latest buffered sub-page address in the page buffer 112 and cache memory 114. For example, in the embodiment of FIG. 4, a sub-page selector 402 of the control circuit 106 selects to delete data of sub-page Cnk2 in the cache memory 114, and stores data of the sub-page Cnk1 stored in the page buffer 112 into the cache memory 114 to replace the data of the sub-page Cnk2 in the cache memory 114. The sub-page selector 402 is coupled to the NAND flash memory 108, and controlled by the host 102 with information from the tag table 120 (for example, controlled by an address information of a command output from the host 102) to selectively transfer sub-page data between the page buffer 112 and the cache memory 114. In some implementations, the sub-page selector 402 is controlled by the control circuit 106 itself without host 102 intervening with a replacement policy. In addition, when it is determined in step S306 that the data needed to execute the program is stored in the page buffer 112, step S310 may be directly entered.

Then, the control circuit 106 performs ECC verification on the data needed to execute the program according to a sub-page error correction code accompanied with the data needed to execute the program so as to correct the errors of data (step S314). Since the data needed to execute the program is not long in sub-page length, the correctable bit number of the sub-page error correction code is small. For example, the sub-page error correction code with 1 bit correction capability is used to perform error correction, but is not limited therein. The control circuit 106 judges whether the error correction is successful or not (step S316). If successful, the error correction of the data enters step S304, and conveys the read-out data to the host 102 through the input/output port 404. If the error correction of the data fails, the control circuit 106 performs the error correction of data according to a page error correction code accompanied with the data (step S318). For example, in the embodiment of FIG. 4, the sub-page Cnk2 may include a sub-page error correction code with low-bit correction capability (for example, a sub-page error correction code with 1-bit correction capability). The control circuit 106 may perform error correction on the data of the subpage Cnk2 in the cache memory 114 according to the sub-page error correction code. Compared to using a sub-page error correction code with multi-bit correction capability (for example, a sub-page error correction code with 4-bit correction capability), using a subpage error correction code with low bit correction capability can complete data error correction more quickly, and improve the execution efficiency of the flash memory device 104. If the control circuit 106 performs unsuccessful error correction on the data of the sub-page Cnk2 of the cache memory 114, the control circuit 106 may re-read data of the entire page Pn by the page buffer 112, store the data of the page Pn into the cache memory 114, and correct the error of the data of the page Pn, including the sub-page Cnk2, in cache memory 114 according to the data of the page Pn and a page error correction code (which has multi-bit correction capability, for example, 4-bit correction capability) included in the page Pn. Thus, another ECC verification mechanism is provided to further ensure the correctness of the data accessed by the control circuit 106 and increase the reliability of the flash memory device 104.

In a part of embodiments, when the error correction in step S316 is unsuccessful, the sub-page selector 402 of the control circuit 106 firstly makes a back-up of the sub-page data in the cache memory 114 (for example, the data of sub-page Cnk0, the sub-page Cnk1 and sub-page Cnk3) into the page buffer 112. When the error correction of the data of the sub-page Cnk2 is completed, the data of sub-page Cnk0, the sub-page Cnk1 and sub-page Cnk3 is transferred back to the cache memory 114. In other embodiments, the sub-page data in the cache memory can be deleted, and the sub-page data of which the error correction is completed can be stored into the cache memory 114. The tag table 102 has to be updated according to the latest status of page buffer 112 and the data cache.

Figure 5:
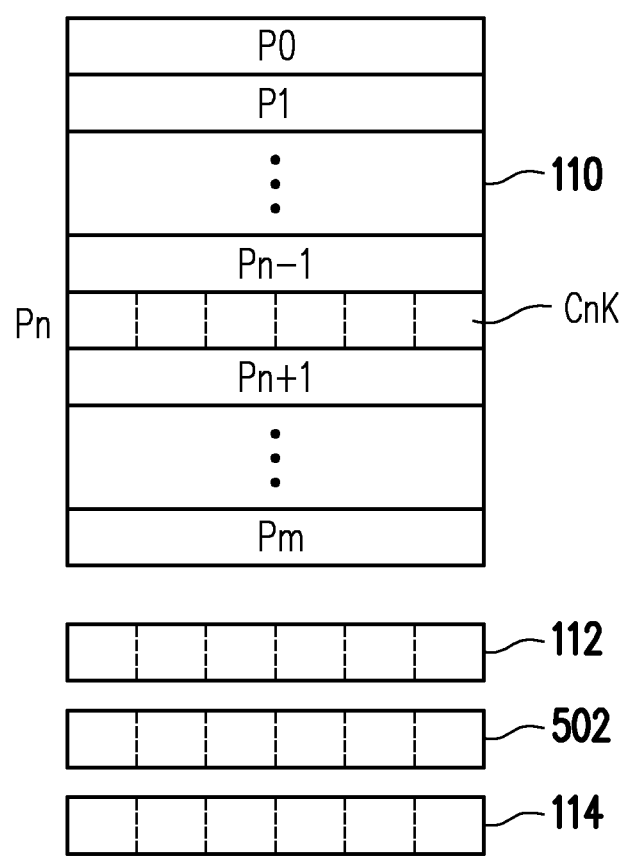
FIG. 5 is a schematic diagram of an NAND flash memory according to another embodiment of the present invention.
Figure 6:
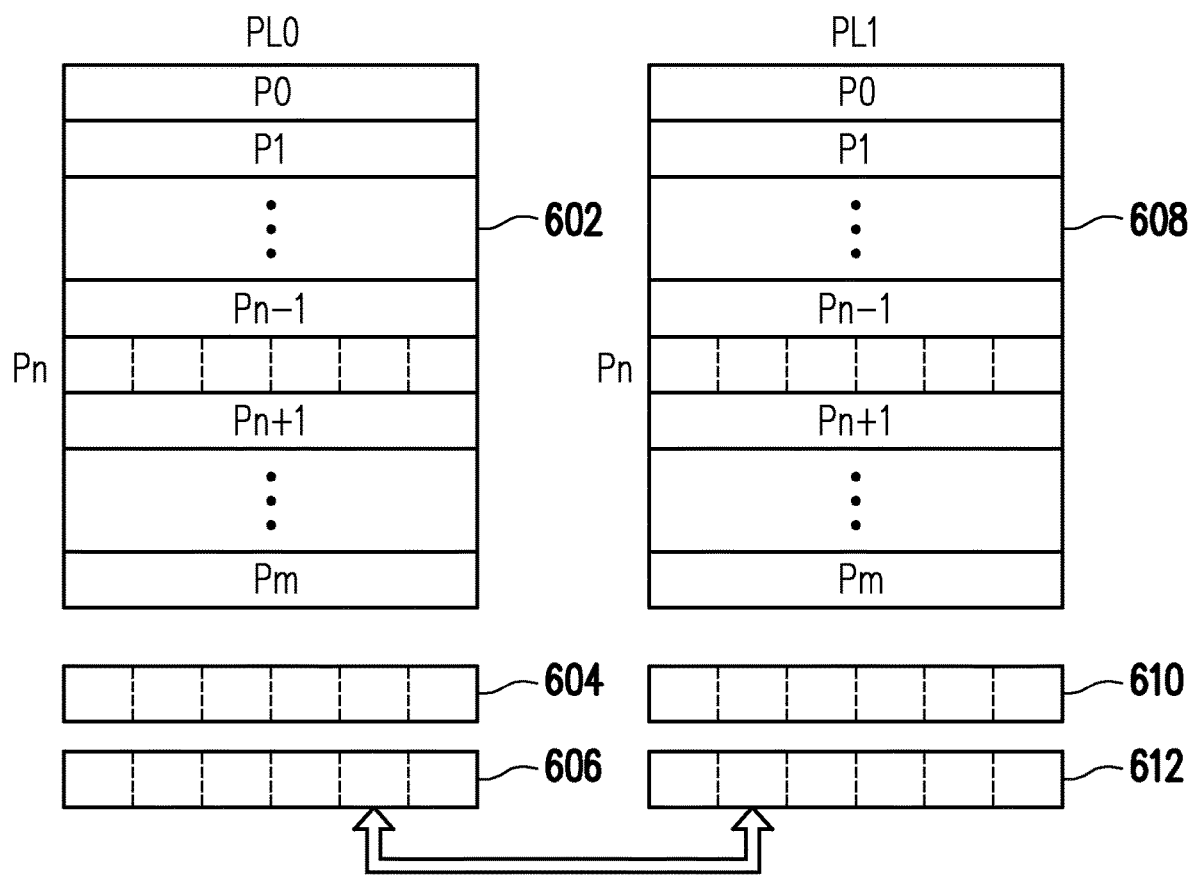
FIG. 6 is a schematic diagram of an NAND flash memory according to another embodiment of the present invention.

It should be noted that although the NAND flash memory 108 in the above-mentioned embodiment is described by taking the primary cache memory 114 as an example, the level of the cache memory 114 is not limited therein. For example, as illustrated in the embodiment of FIG. 5, in addition to the cache memory 114, the NAND flash memory 108 includes a cache memory 502 and forms a two-level cache memory structure. Like the above-mentioned embodiments, the access of the cache memory 502 is performed in units of one sub-page. Since the access operation of the two-level cache memory is like the above-mentioned access operation, and thus the implementation details thereof are not repeated herein. In addition, in other embodiments, the NAND flash memory 108 includes a plurality of memory planes, each memory plane is provided with the corresponding NAND flash memory array, the page buffer and the cache memory, each plane corresponds to different cache memories, and data can be transmitted between the cache memories of different memory planes. For example, as illustrated in FIG. 6, the NAND flash memory 108 includes memory planes PL0 and PL1, wherein memory plane PL0 includes an NAND flash memory array 602, a page buffer 604 and a cache memory 606, and memory plane PL1 includes an NAND flash memory array 608, a page buffer 610 and a cache memory 612. Data can be transmitted between cache memories of memory plane PL0 and memory plane PL1. Thus, the data of the page buffer and the cache memory of each memory plane comes not only from different pages but also from different memory planes, so that access data in the cache memory includes a wide scope.

Based on the above, each page of the NAND flash memory array in the present invention includes the plurality of sub-pages. Each sub-page has the sub-page length. The control circuit performs the cache operation of the cache memory in units of one sub-page, so that the NAND flash memory is suitable for performing random access operation so as to meet the increasing requirements of the embedded-in application.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A flash memory device comprising:
   an NAND flash memory, comprising:
      an NAND flash memory array, comprising a plurality of pages, wherein each page comprises a plurality of sub-pages, each sub-page has a sub-page length;
      a cache memory, the cache memory is composed of a plurality of sub caches and the plurality of sub caches corresponds to different pages of the NAND flash memory array;
      a page buffer, the page buffer is composed of a plurality of sub-page buffers and the plurality of sub-page buffers corresponds to different pages of the NAND flash memory array, wherein each of the plurality of sub-pages of the same sub-page offset in the page buffer and in the cache memory come from different pages of the NAND flash memory array; and
   a control circuit, coupled to the NAND flash memory, performing an access operation in units of one sub-page.

2. The flash memory device according to claim 1, wherein the control circuit performs data prefetching on adjacent pages of currently read pages and stores the prefetched data on the page buffer or the cache memory according to a host request.

3. The flash memory device according to claim 1, wherein data of each sub-page comprises a sub-page error correction code, and the control circuit performs error correction on data of a corresponding sub-page according to the sub-page error correction code.

4. The flash memory device according to claim 3, wherein the sub-page error correction code has 1 bit correction capability.

5. The flash memory device according to claim 3, when the control circuit fails to correct errors of the data of the corresponding sub-page according to the sub-page error correction code, the control circuit re-reads data of a page comprising the corresponding sub-page by the page buffer, stores the data of the page into the cache memory, and corrects all the data of the page, comprising the corresponding sub-page, according to the data of the page and a page error correction code comprised in the page.

6. The flash memory device according to claim 5, wherein the page error correction code has multiple bits correction capability.

7. The flash memory device according to claim 1, wherein the cache memory is a multiple-level cache memory, a cache operation is performed on the multiple-level cache memory in units of one sub-page.

8. The flash memory device according to claim 1, wherein the NAND flash memory comprises a plurality of memory planes, each plane corresponds to different caches.

9. The flash memory device according to claim 1, wherein the NAND flash memory comprises:
   cache memories, the control circuit performs a cache operation on the cache memories to selectively transfer data among the cache memories of a plurality of memory planes in units of one sub-page.

10. The flash memory device according to claim 1, wherein the control circuit comprises:
    a sub-page selector, coupled to the NAND flash memory, controlled by address information of the command from a host and used to selectively transfer data between the page buffer and the cache memory in units of one sub-page.

11. The flash memory device according to claim 10, wherein the NAND flash memory array comprises a tag table that records the address information of the sub-pages of the page buffer and the cache memory.

12. The flash memory device according to claim 1, wherein the control circuit reads out the data from the plurality of sub-pages of the NAND flash memory array, stores read out sub-page data to the page buffer, selects sub-page data to be overridden in the cache memory, and transfers the read out sub-page data to the cache memory.

13. The flash memory device according to claim 1, wherein when data is stored in the cache memory, the control circuit conveys the data read from the cache memory to a host.

14. The flash memory device according to claim 13, wherein when the data is stored in the page buffer instead of storing in the cache memory, the control circuit selects the sub-page data to be overridden in the cache memory and transfers the data to the cache memory.

15. A flash memory system, comprising:
    a host, fetching data;
    a flash memory device, coupled to the host, and accessed by the host for data, wherein the flash memory device comprises:
    an NAND flash memory, comprising:
       an NAND flash memory array, comprising a plurality of pages, wherein each page comprises a plurality of sub-pages, each sub-page has a sub-page length;
       a cache memory, the cache memory is composed of a plurality of sub caches and the plurality of sub caches corresponds to different pages of the NAND flash memory array; and
       a page buffer, the page buffer is composed of a plurality of sub-page buffers and the plurality of sub-page buffers corresponds to different pages of the NAND flash memory array, wherein each of the plurality of sub-pages of the same sub-page offset in the page buffer and in the cache memory come from different pages of the NAND flash memory array; and
    a control circuit, coupled to the host and the NAND flash memory, performing an access operation in units of one sub-page.

* * * * *